United States Patent
Bailey

(10) Patent No.: US 6,758,442 B2
(45) Date of Patent: Jul. 6, 2004

(54) GUIDED PARAFOIL SYSTEM FOR DELIVERING LIGHTWEIGHT PAYLOADS

(75) Inventor: Glen Randall Bailey, Scottsdale, AZ (US)

(73) Assignee: Stara Technologies, Inc., Mesa, AZ (US)

( * ) Notice: Subject to any disclaimer, the term of this patent is extended or adjusted under 35 U.S.C. 154(b) by 0 days.

(21) Appl. No.: 10/284,699

(22) Filed: Oct. 30, 2002

(65) Prior Publication Data

US 2004/0084567 A1 May 6, 2004

(51) Int. Cl.[7] ............................................... B64D 17/00
(52) U.S. Cl. ....................................................... 244/142
(58) Field of Search ........................... 244/138 R, 142, 244/139, 152, 149

(56) References Cited

U.S. PATENT DOCUMENTS

| | | | | |
|---|---|---|---|---|
| 3,315,921 A | * | 4/1967 | Riley et al. |
| 3,433,441 A | * | 3/1969 | Cummings |
| 3,534,931 A | * | 10/1970 | Rogallo |
| 3,962,537 A | * | 6/1976 | Kearns et al. |
| 4,113,208 A | * | 9/1978 | Manfredi |
| 5,407,151 A | * | 4/1995 | Singhal |
| 5,678,788 A | * | 10/1997 | Hetzer et al. |
| 5,810,293 A | * | 9/1998 | Leeki-Woo |
| 5,884,867 A | * | 3/1999 | Gordon et al. |
| 5,899,415 A | * | 5/1999 | Conway et al. |
| 6,042,056 A | * | 3/2000 | Chopard |
| 6,131,856 A | * | 10/2000 | Brown |
| 6,311,106 B1 | * | 10/2001 | Dupont |
| 6,338,457 B1 | * | 1/2002 | Hilliard et al. |

* cited by examiner

Primary Examiner—Tien Quang Dinh
(74) Attorney, Agent, or Firm—Andrew M. Harris; Harry M. Weiss; Weiss, Moy & Harris, P.C.

(57) ABSTRACT

A guided parafoil system for delivering lightweight payloads provides an accurate, small and low-cost delivery system for small payloads such as chemical sensor packages. The delivery system is adapted to fit along with the payload within a standardized canister. The delivery system includes a parafoil and a guidance control system that includes a global positioning system (GPS) receiver and an electronic compass to detect a deviation and bearing from a desired target. The parafoil is guided by a single motor that turns the parafoil in a horizontal direction perpendicular to the current direction of travel in response to deviations detected from a desired course. The desired course is initially linear until the system reaches a predetermined horizontal radius from the target and then the course becomes a circular path around and above the target.

20 Claims, 6 Drawing Sheets

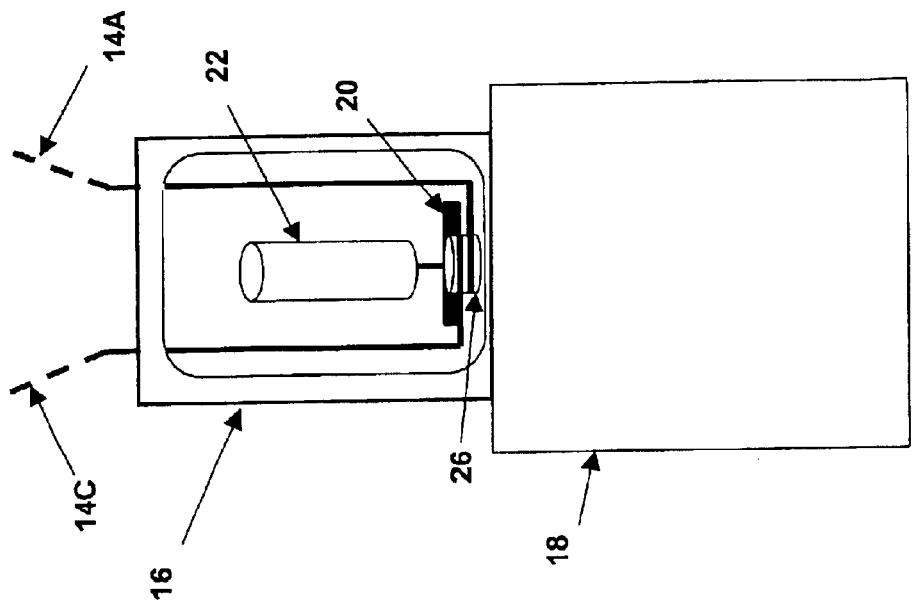
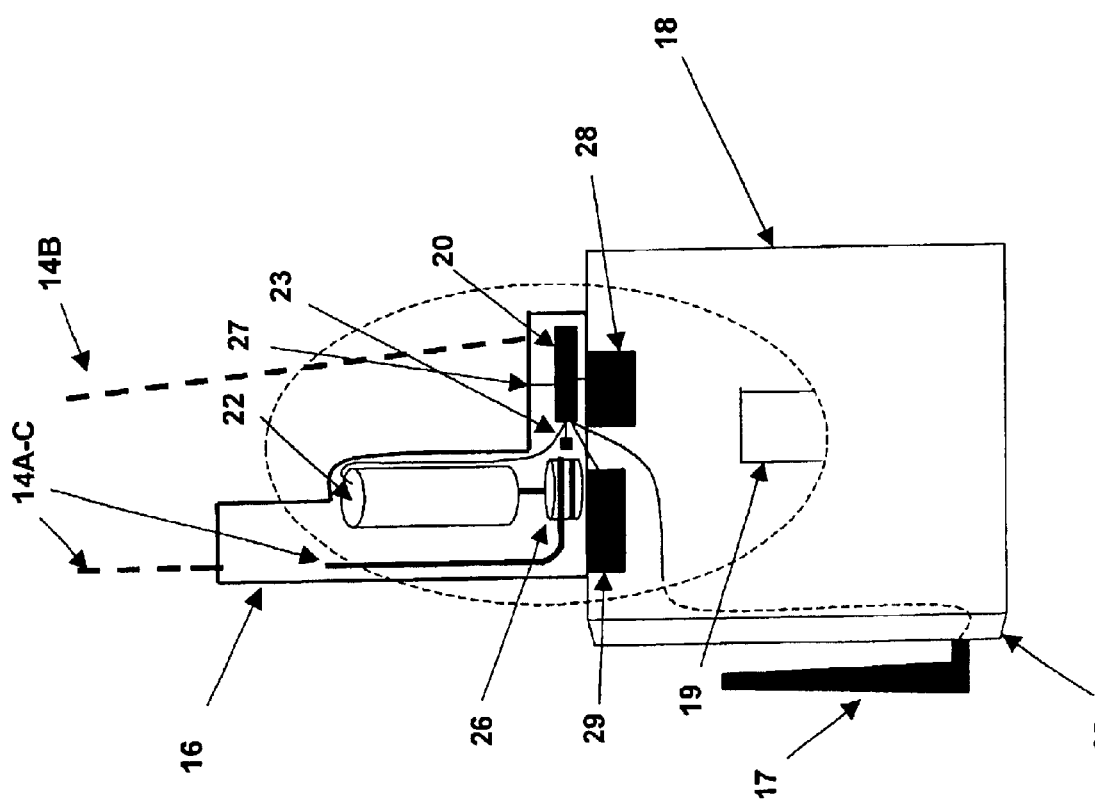
Fig. 3B
Fig. 3A

US 6,758,442 B2

GUIDED PARAFOIL SYSTEM FOR DELIVERING LIGHTWEIGHT PAYLOADS

BACKGROUND OF THE INVENTION

1. Field of the Invention

The present invention relates generally to payload delivery systems, and more specifically, to a guided parafoil system delivering lightweight payloads.

2. Background of the Invention

Chemical sensors, electronic sensing devices, as well as other lightweight packages often must be delivered via airdrop to a detection zone. In many cases, such as a possible hazardous area, the only practical way to deliver the sensor package is via aerial delivery. However, unguided airdrop of packages, particularly lightweight packages, is subject to drift error that may land the payload far from the desired drop location.

Guidance systems have been employed in delivery systems for large payloads (often weighing over several tons), and the added cost of the guidance system as well as the added weight of the power supplies, guidance computers, and control systems is typically justified by the size and cost of the payload. The guidance and control systems of the aforementioned delivery systems are typically very heavy, using either motorized propulsion or multi-axis guidance systems to provide sophisticated targeting capability.

Further, existing packages for uncontrolled drops are small with respect to the above-mentioned payload delivery systems. Canisters for deployment of electronic surveillance and countermeasures are standardized and it would be advantageous to provide a payload delivery system that is small enough to be deployed along with a payload in such a canister.

Therefore, it is desirable to provide a payload delivery system that is small, low cost and accurate. It would further be desirable to provide a payload delivery system that may be contained along with a small payload in a standardized canister.

SUMMARY OF THE INVENTION

The above objectives of providing a low cost, accurate and small payload delivery system for lightweight payloads are provided in a method and system that use a parafoil and a guidance system including a single motor for guidance control. The guidance system activates the motor to direct the parafoil in a horizontal direction perpendicular to a current direction of travel of the parafoil. The parafoil system is guided to a predetermined radius from the target and then is further guided in a downward spiral within a cylinder above the target until the descent is complete. Any deviations outside of the circular/spiral path are corrected by the guidance system in response to a deviation between a current position of the parafoil system and the cylinder. The parafoil is guided by a motor coupled to the guidance system that tensions a set of cables connected to the left or right side of the parafoil and loosens the other set of cables.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

FIGS. 3A and 3B are pictorial diagrams depicting details of the internal components of guidance system container 16 and payload container 18 of FIG. 1.

DETAILED DESCRIPTION OF THE EMBODIMENTS

Figure 1:
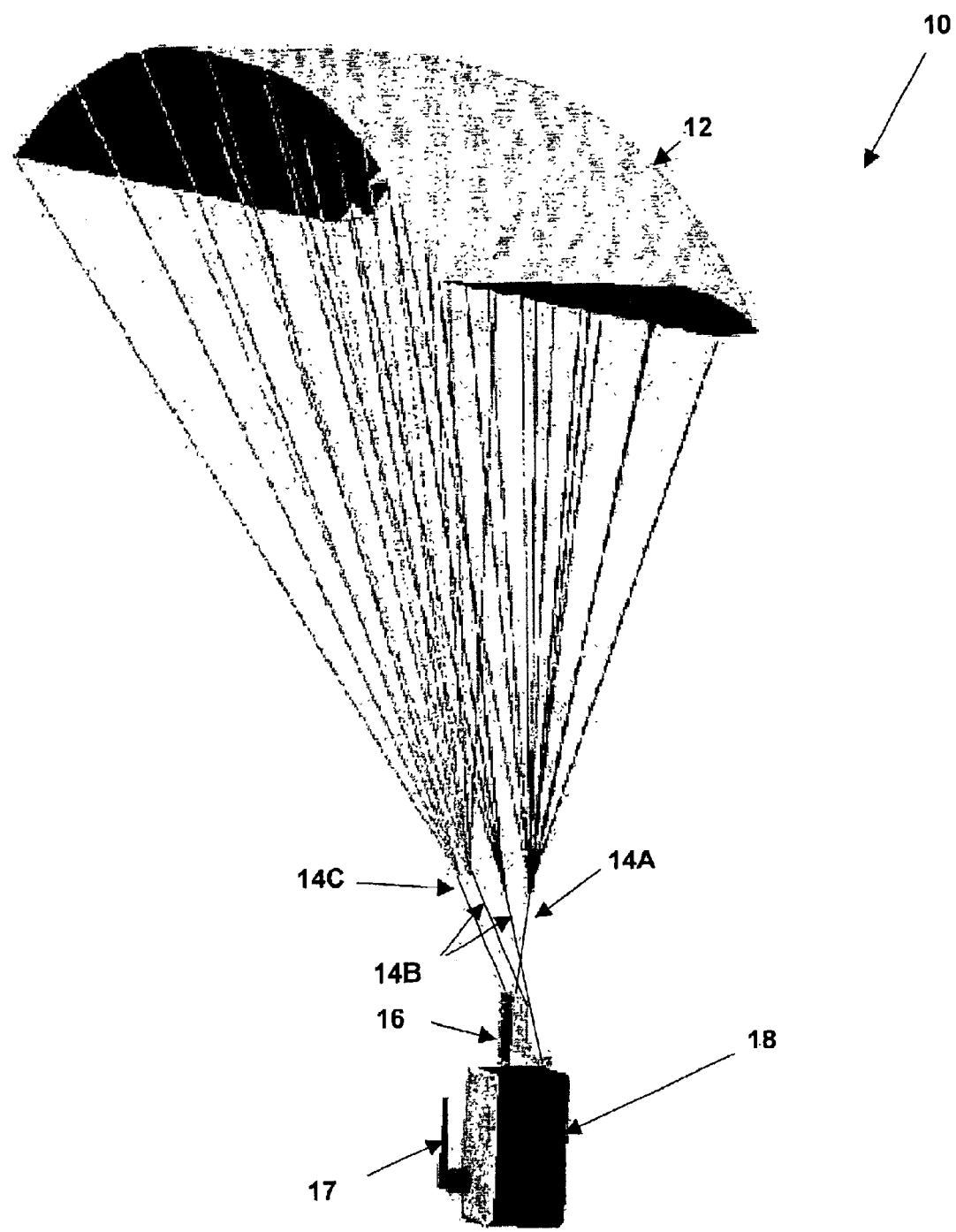
FIG. 1 is a pictorial diagram depicting a guided parafoil delivery system in accordance with an embodiment of the present invention.

Referring now to the figures and in particular to FIG. 1, a guided parafoil delivery system 10 in accordance with an embodiment of the present invention is shown. System 10 includes a parafoil 12 for reducing a rate of descent (via air drag) of a payload container 18. The payloads transportable by system 10 are generally on the order of one to 100 pounds, but the weight of the payload should not be construed as a limitation on the present invention, unless as applied to a claim that recites a weight limitation. The present invention is applicable to delivery of chemical sensors and other electronic devices as well as other lightweight payloads.

Payload container 18 is mechanically coupled to parafoil 12 via a guidance system container 16 that houses components for controlling the flight path and descent of parafoil 12. An optional telemetry antenna 17 is shown attached to payload container 18 for exchange of information via radio frequency broadcast with a ground station or airborne transceiver. A first set of control cables 14A is connected to a set of connection points on parafoil 12 that are disposed on a back edge of the right side of parafoil 12. Shortening cables 14A increases the drag of the right side of parafoil 12, steering parafoil 12 to the right. A second set of cables 14C is connected to a set of connection points on parafoil 12 that are disposed on a back edge of the left side of parafoil 12. Shortening cables 14A increases the drag of the left side of parafoil 12, steering parafoil 12 to the left. The first and second set of cables 14A and 14C are generally connected to more flexible "risers" on the back edges of parafoil 12, while the remaining cables 14B are connected to connection points on the main body of parafoil 12, but other implementations are possible, such as configurations where risers are not employed and cables 14B may also be absent, providing steering by shifting the center point of guidance system container 16 and payload container 18 with respect to parafoil 12 and supporting a payload entirely via the control cables 14A and 14C.

Parafoil 12 is steered by shortening a set of control cables 14A or 14C and simultaneously lengthening the other set of control cables 14C or 14A, causing parafoil 12 to turn in the direction of increased drag on the side of parafoil 12 controlled by the shortened cable set.

Figure 2:
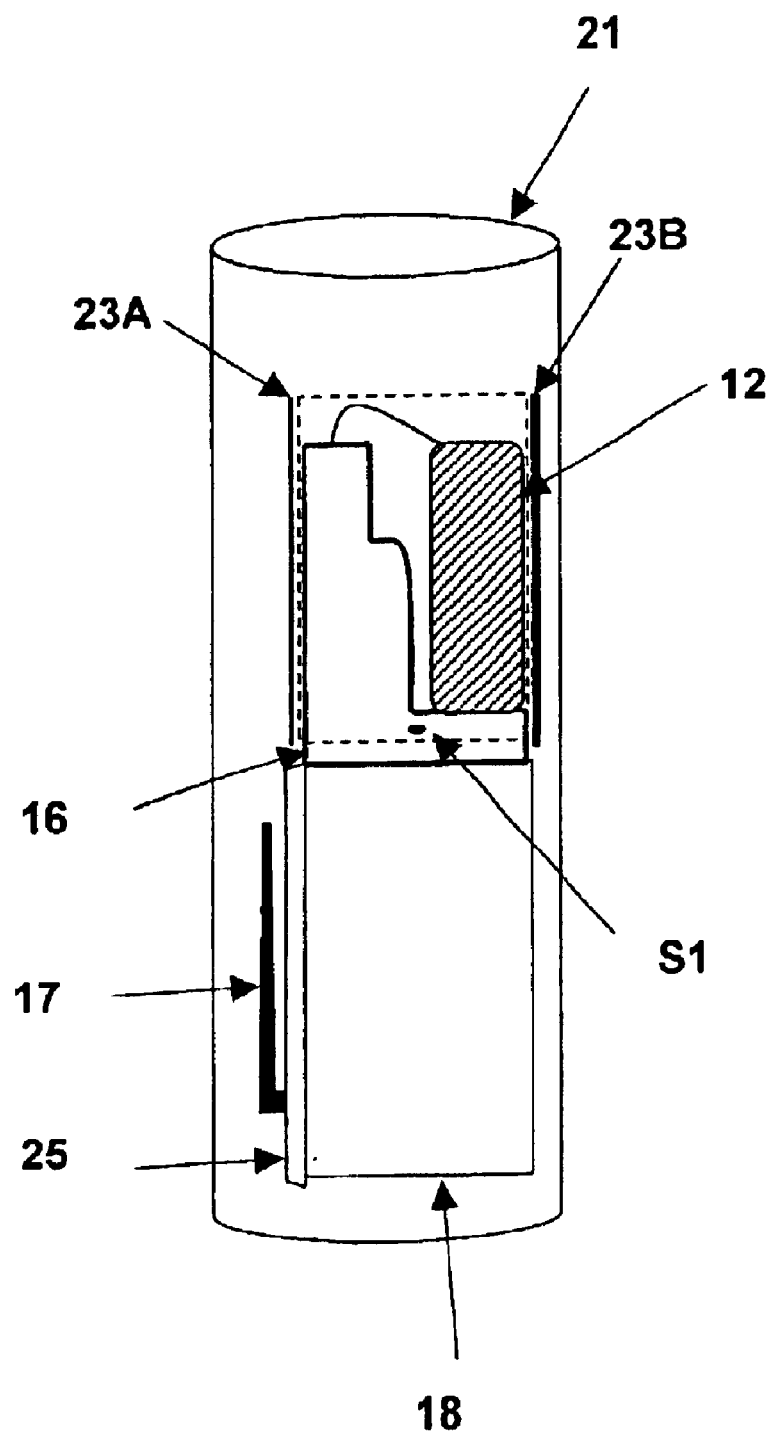
FIG. 2 is a pictorial diagram depicting guided parafoil delivery system 10 prior to deployment as stored in an airdrop container.

Referring now to FIG. 2, system 10 is shown stowed in a canister 21 of the size generally available for airdrop of countermeasures electronics and sensing systems. In particular, the size of canister may be 4"×4" by 12" in length, which is consistent with countermeasures canisters currently employed for the delivery of chemical sensor packages.

Parafoil 12, is folded and stowed above guidance system container 16 and is attached to payload container 18. A removable cover 25 on which optional telemetry antenna 17 is mounted, provides access to payloads within payload container 18 prior to insertion within container 21. Two L-shaped cover plates 23A–23B surround parafoil 12 and guidance system container 16. The cover plates are ejected after deployment of system 10 from canister 21. A sensor S1, depicted as a switch, but which may be implemented as a Hall effect sensor (mounted on guidance system container 16) and magnet (mounted on one of cover plates 23A–23B) or other suitable sensing device, provides detection of ejection of cover plates 23A–23B after deployment. Sensor S1 provides a signal to the guidance system within guidance system container 16 to activate control of parafoil 12. An additional time delay can be set to further delay the activation of guidance system components until parafoil 12 has completely deployed and is in stable descent.

Referring now to FIGS. 3A and 3B, internal features of the guidance system container 16 and payload container 18 are depicted. A payload 19 is placed within payload container 18 for delivery to a target zone. A battery 29 and compass 29 are also mounted within payload container 18 and electrically connected to a guidance control 20 within guidance system container 16 via cables. In addition or alternative to compass 29, a global positioning system (GPS) antenna 27 and receiver are employed, with GPS antenna 27 shown mounted conformal to the surface of guidance system container 16. Compass 29 is an electronic compass such as a magnetic compass that provides horizontal bearing information to guidance control 20. A GPS receiver within guidance control 20 and coupled to GPS antenna 27 provides periodic position information to guidance control 20 in addition to compass 29. In some embodiments, in particular for navigation systems providing data at a higher rate than standard GPS, compass 29 may be omitted, and horizontal bearing may be calculated from changes in the GPS reported position. Further, compass 29 may be an alternative device, such as an inertial navigation system, TACAN or VOR receiver, or other device that may provide bearing information to the guidance control 20.

Within guidance system container 16, a motor 22 is coupled to control cables 14A and 14C of parafoil 12 via a winch drum 26. When motor 22 is rotated, one set of cables (14A or 14C) is shortened (or tensioned) and the other set is lengthened (or loosened), steering parafoil 12 in a horizontal direction perpendicular to the trajectory of parafoil 12. Paths and apertures within the walls of guidance system container 16 provide for smooth travel of cables 14A and 14C from winch drum 26 to the outside of guidance system container 16. A position sensor 23 provides an indication of a "zero position" of winch drum (e.g., where the lengths of cables 14A and 14C outside of guidance system housing 16 are equal), so that guidance control 20 can be properly initialized to a neutral steering condition. A shaft position sensor incorporated within motor 22 and coupled to guidance control 20 may be incorporated to control the precise length of cables 14A and 14C, as well as the rate of rotation of motor 22, permitting control over the positioning profile of motor 22. Controlling the rate and acceleration curves of motor 22 provides improved control of parafoil 12, providing smooth operation at the endpoints of motor positioning events.

Figure 4:
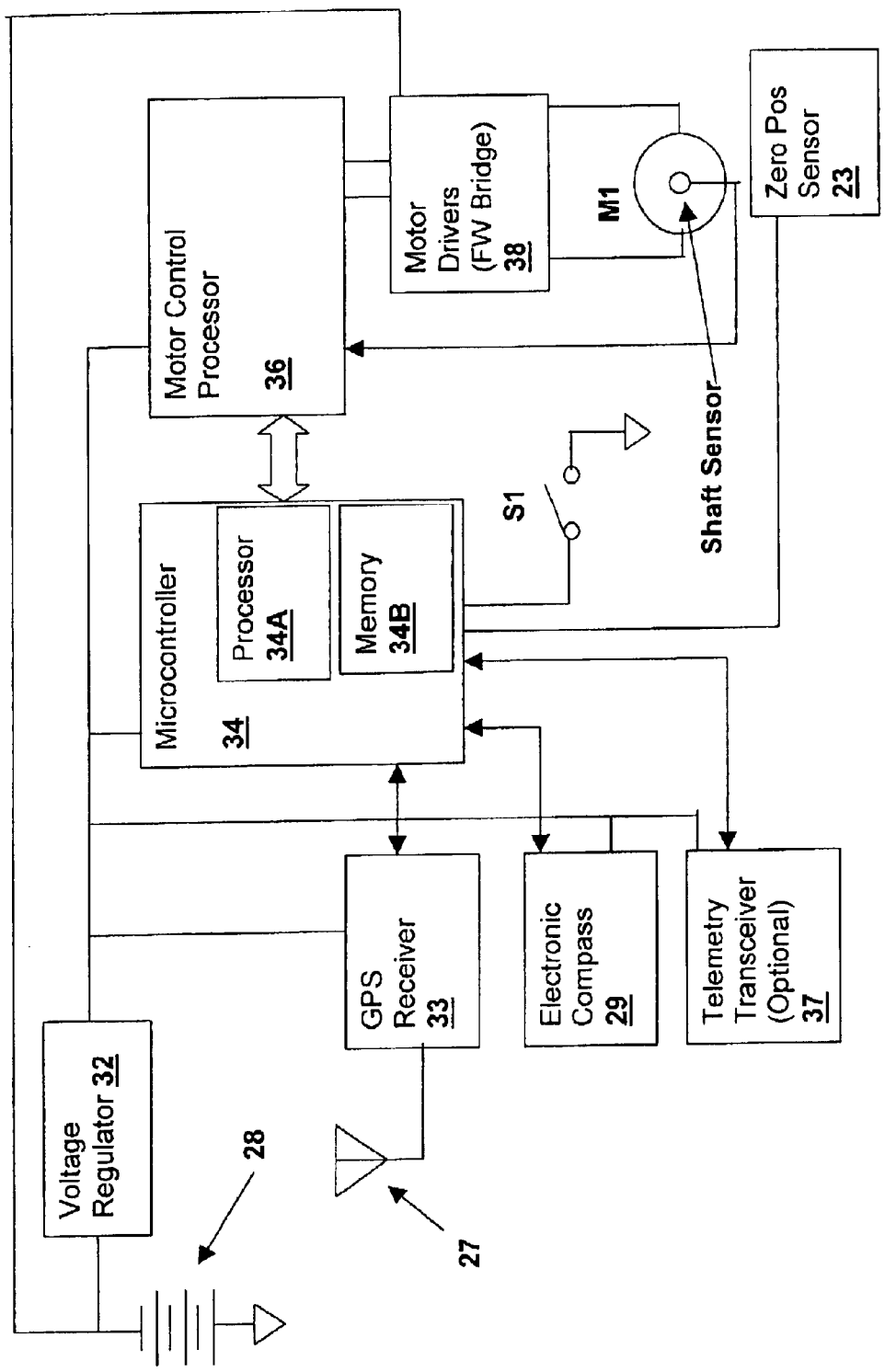
FIG. 4 is an electrical block diagram depicting details of guidance control circuit 20 of FIGS. 3A and 3B.

Referring now to FIG. 4, a schematic of a guidance control 20 and associated electronic components is depicted in accordance with an embodiment of the present invention. Battery 28 supplies power to the circuits of guidance control 20 and other components via a voltage regulator 32, which provides the regulated voltage required by I/O devices and processors, while unregulated battery power is supplied to motor drivers 38. A microcontroller 34 provides computation of the parafoil trajectory in conformity with information received from an electronic compass 29 and a GPS receiver 33 (via GPS antenna 27). GPS receiver 33 provides positional information and electronic compass 29 provides horizontal bearing information. GPS receiver 33 generally does not provide data at a sufficient rate to determine horizontal bearing, therefore electronic compass 29 (or alternatively an inertial navigation system, etc.) is needed so that proper course correction may be calculated.

Further, microcontroller 34 observes the rate of change of horizontal bearing from electronic compass 29 during flight to determine whether or not the system is in an undesirable flight condition. If an undesirable flight condition is detected, motor M1 is restored to the zero position determined by sensor 23 and the system guidance algorithm restarts after flight stability is recovered. Examples of undesirable flight conditions that can be detected using the rate of horizontal bearing changes are payload oscillation, where a heavy payload swings and causes the parafoil to change direction rapidly, and spiral divergence, where the payload swings out while the parafoil turns downward, causing the lift vector of the parafoil to become substantially horizontal. Either condition disrupts the regular flight path and thus the guided operation of the system and therefore it is desirable to detect the above-mentioned and other unstable flight conditions so that remedial action can be taken and guided operation restored.

Switch S1 optionally detects deployment of the parafoil via detection of parafoil cover ejection, separation of a suspended payload housing from the guidance system container or other suitable mechanism. At deployment, microcontroller (via program instructions stored in a memory 34B and executed by a processor core 34A) sets the motor (and winch pulley 26) to the zero start position via feedback from winch position sensor 23. Microcontroller 34 then computes the deviation of the flight path from a desired path to the ground target. Initially, the flight path is substantially a straight line toward the target, with a terminal cylindrical path above the target once the system has reached a predetermined distance from the target.

When microcontroller 34 determines that a course correction is needed, a motor control processor 36 is instructed to turn motor 22, in a direction corresponding to the sign of the deviation and with a torque (motor current) proportional to the magnitude of the deviation. Motor drivers 38 supply the current from battery 28 to the motor via an H-bridge switching network, and receive feedback from the shaft sensor within motor 22. The motor current setting can be provided by pulse width control generated by motor control processor 36, which may follow pre-programmed profiles for acceleration/deceleration. Control is proportional to the calculated deviation and adjustment of the length of cables 14A and 14C controlled by motor 22 can be set very precisely due to the shaft sensor feedback to motor control processor 36.

Figure 5:
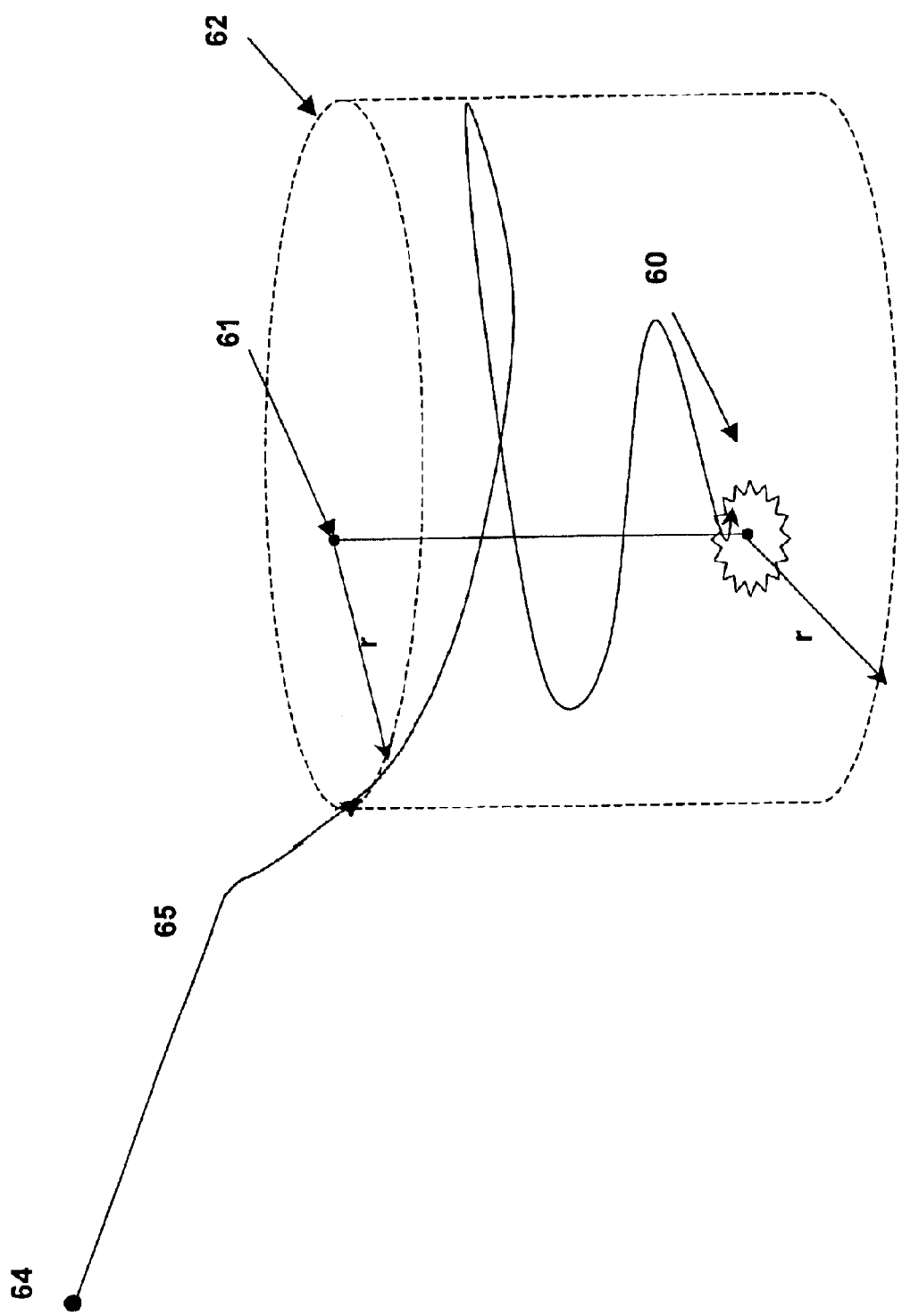
FIG. 5 is a pictorial diagram depicting a trajectory of a guided parafoil delivery system in accordance with an embodiment of the present invention.

Referring now to FIG. 5, a trajectory 65 of a guided parafoil delivery system in accordance with an embodiment of the present invention is depicted. Initially, the system is guided from a start point 64 (the location of the system after deployment and initial start-up delay) in a linear path toward a target 60. With glide ratios ranging from 2:1 to 4:1, linear flights of 2 miles for a drop height of 5000 feet can be reliably achieved. Glide ratios are dependent on the parafoil design and load as well as local air conditions and wind.

After the system has come within a predetermined horizontal radius above the target, guidance proceeds based on a control cylinder 62 extending axially above and symmetrically disposed circumferentially around the horizontal position of the target.

Control cylinder 62 is disposed around an axis 61 rising vertically above target 60. The radius of cylinder 62 is generally 100 feet, but may be any value suitable for the aerodynamics and size of a particular system. If trajectory 65 of the system exceeds the boundary of cylinder 62 a correction is applied, turning parafoil 12 inward, thus causing parafoil 12 to veer back toward the circumference of cylinder 62.

When the system is within cylinder 62, a variety of options may be chosen for guidance, including neutral or no control. Alternatively, the set of cables 14A or 14C on the side facing axis 61 may be pulled to an extreme position, increasing the descent of parafoil (if cylinder 62 is exceeded at any time, the control function described above will be resumed). Alternatively, if trajectory 65 of the system falls too far inside the boundary of cylinder 62 a correction 64 may be applied, turning parafoil 12 outward from axis 61. The outward turning control causes parafoil 12 to veer back toward the circumference of cylinder 62, maintaining a constant control function, but generally limiting the approach to target 60 to the radius of cylinder 62.

Figure 6B:
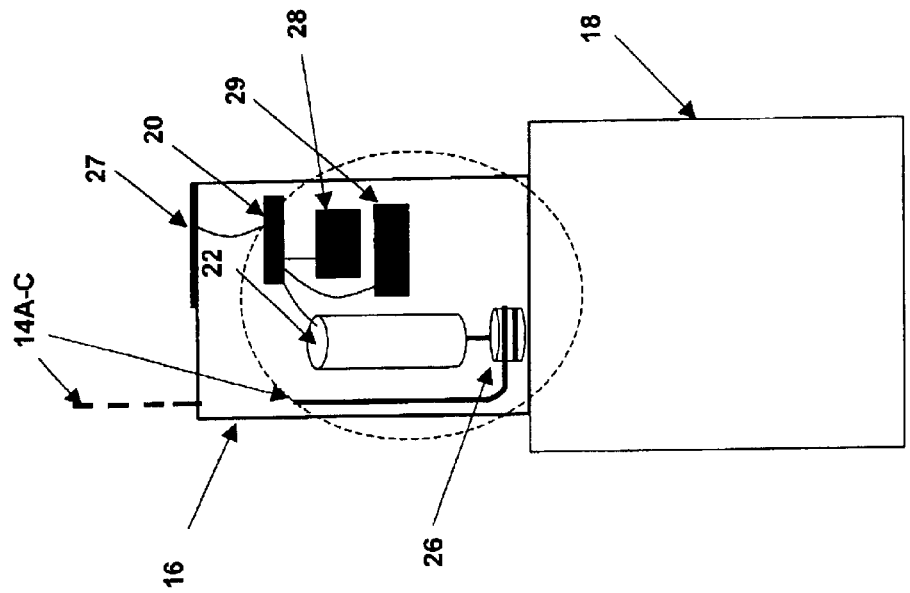
FIGS. 6A and 6B are pictorial diagrams depicting the guidance system and payload container portions of guided parafoil delivery systems in accordance with alternative embodiments of the invention.
Figure 6A:
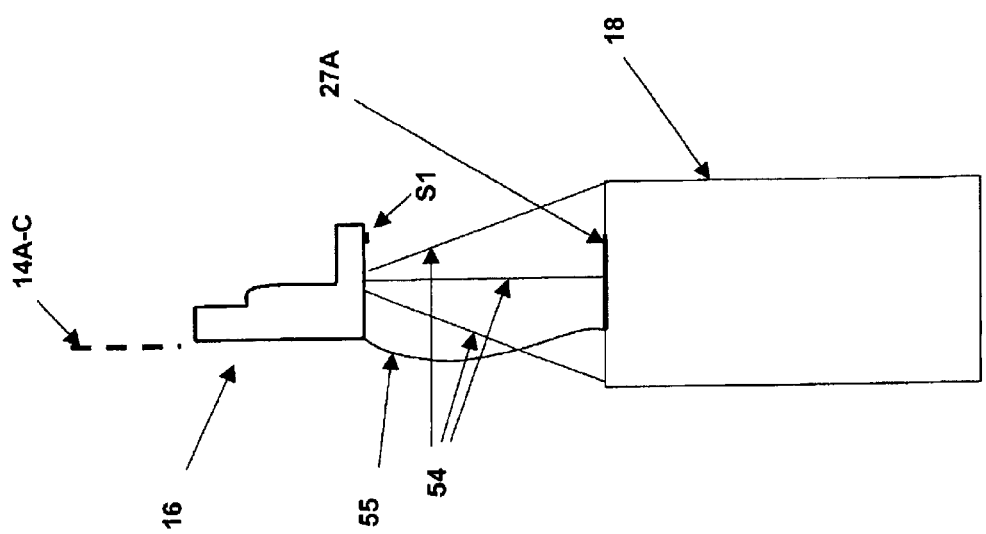

Referring now to FIG. 6A, a view of internal features of guidance system container 16 and payload container 18 are depicted in accordance with an alternative embodiment of the present invention. In the alternative embodiment, guidance system container 16 is connected to payload container 18 by a set of cables 54 that extend after deployment of the system. A GPS receiver 27A is mounted on the top surface of payload container 18 and is connected to guidance control 20 (not shown) via a cable 55. The above-illustrated configuration provides for operation of GPS receiver 27A without pattern distortion and blockage due to guidance system container and its internal components shadowing GPS receiver 27A. (Cables 54 will generally be longer than depicted, providing sufficient distance between guidance system container 16 and payload container 18). Alternatively, GPS receiver may also be mounted with payload container 18 and coupled to guidance control 20 via a serial or other interface. Switch S1 is mounted on guidance system container 18 for detection of separation of guidance system container 16 from payload container 18 at deployment.

Referring now to FIG. 6B, a view of internal features of guidance system container 16 and payload container 18 are depicted in accordance with another alternative embodiment of the present invention. In the other alternative embodiment, guidance system container 16 is connected to payload container 18 directly. A GPS receiver 27 is mounted on the top surface of guidance system container 16 and is connected to guidance control 20. In the depicted embodiment, battery 28, compass 29 and motor 22 are all contained within guidance system container.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A guided payload delivery system for delivering a payload to a target on the ground, comprising:

a parafoil for reducing a rate of fall of said payload, said parafoil including a first set of control cables for controlling drag on a right side of said parafoil and a second set of cables for controlling drag on a second side of said parafoil;

a location sensor for determining a physical position of said delivery system;

a horizontal bearing sensor for determining a horizontal bearing of said delivery system;

a guidance control coupled to said location sensor and said horizontal bearing sensor for computing a deviation of a trajectory of said physical position from a cylinder extending axially above said target and having a predetermined diameter; and a motor coupled to said guidance control for shortening one of said first set of cables and said second set of cables and lengthening another one of said first set of cables and said second set of cables, in response to said guidance control computing that said trajectory deviates from said cylinder, wherein said shortened set of cables is selected in conformity with a sign of said deviation, whereby said system is guided to land near said target.

2. The guided parafoil delivery system of claim 1, wherein a radius of said cylinder is substantially equal to 100 feet.

3. The guided parafoil delivery system of claim 1, wherein said motor is a single motor that provides all guidance mechanical control for said parafoil.

4. The guided parafoil delivery system of claim 1, wherein said location sensor is a global positioning system (GPS) receiver.

5. The guided parafoil delivery system of claim 1, wherein said horizontal bearing sensor is an electronic compass.

6. The guided parafoil delivery system of claim 1, wherein said guidance control computes a magnitude of said deviation and wherein said shortening and lengthening are applied in proportion to a magnitude of said deviation.

7. The guided parafoil delivery system of claim 1, wherein said system is adapted to fit along with said payload within a container having dimensions substantially less than or equal to one foot per side.

8. The guided parafoil delivery system of claim 1, further comprising:

a guidance system container mechanically coupled to said parafoil, wherein said guidance system container contains said guidance control and said motor;

a parafoil cover disposed over said parafoil at an end of said guidance system container prior to deployment, and wherein said parafoil cover is ejected during deployment of said parafoil; and a sensor for detecting ejection of said parafoil cover, wherein said sensor is coupled to said guidance control for activating said computing, whereby said motor is activated only after said deployment.

9. The guided parafoil delivery system of claim 1, further comprising:

a guidance system container mechanically coupled to said parafoil, wherein said guidance system container contains said guidance control and said motor; and a payload container for enclosing said payload, wherein said payload container and said guidance system container are held in proximity with said payload container prior to deployment, wherein said payload container and said guidance system container separate after deployment, wherein said system further comprises a sensor for detecting separation of said guidance system container and said payload container, and wherein said sensor is coupled to said guidance control for activating said computing, whereby said motor is activated only after said deployment.

10. The guided parafoil delivery system of claim 1, wherein said system further comprises:
   a guidance system container mechanically coupled to said parafoil, wherein said guidance system container contains said guidance control, said motor and said horizontal bearing sensor; and
   a payload container mechanically coupled to said parafoil for containing said payload, and wherein said location sensor is a global positioning system (GPS) receiver mounted on said payload container and electrically coupled to said guidance control via one or more cables connected between said payload container and said guidance system container.

11. The guided parafoil delivery system of claim 1, wherein said system further comprises a zero position sensor coupled to said motor and further coupled to said guidance control for determining a zero position of said motor, whereby a position of balanced dispensed length of said first set of cables and said second set of cables is detected.

12. The guided parafoil delivery system of claim 1, further comprising a motor control coupled to said motor and further coupled to said guidance control for providing control of said motor in response to instructions received from said guidance control.

13. The guided parafoil delivery system of claim 12, further comprising a shaft position sensor mechanically coupled to said motor, and electrically coupled to said motor control, whereby said motor control controls a rate of said shortening and lengthening.

14. The guided parafoil delivery system of claim 1, wherein said guidance control computes a rate of change of said horizontal bearing, wherein said guidance control further detects when said rate of change of said horizontal bearing exceeds a threshold, and wherein said guidance control sets a length of said first set of cables and said second set of cables to a zero position in response to said guidance control detecting that said rate of change exceeds said threshold.

15. A method for delivering a payload to a target on the ground, comprising:
   deploying a parafoil mechanically coupled to said payload and further coupled to a guidance system;
   receiving a physical position of said payload from a location sensor;
   receiving a horizontal bearing of said payload from a horizontal bearing sensor;
   computing a deviation of a trajectory of said physical position and said horizontal bearing from a cylinder extending axially above said target and having a predetermined radius; and
   in response to computing that said trajectory deviates from said cylinder, shortening one of said first set of cables and said second set of cables and lengthening another one of said first set of cables and said second set of cables, wherein said shortened set of cables is selected in conformity with a sign of said deviation, whereby said system is guided to land near said target.

16. The method of claim 15, wherein said receiving a physical position receives said physical position via a global positioning system (GPS) receiver.

17. The method of claim 15, wherein said receiving a horizontal bearing receives said horizontal bearing from an electronic compass.

18. The method of claim 15, wherein said computing computes a magnitude of said deviation and wherein said shortening and lengthening are applied in proportion to a magnitude of said deviation.

19. The method of claim 15, further comprising sensing that said parafoil has been deployed, and wherein said computing is commenced in response to said sensing, wherein said shortening and lengthening are applied only after deployment.

20. The method of claim 15, further comprising:
   calculating a rate of change of said horizontal position;
   determining whether or not said rate of change has exceeded a threshold to detect an undesirable flight condition; and
   in response to determining that said rate of change has exceeded a threshold, setting a length of said first set of cables and said second set of cables to a zero position.

* * * * *

US006758442C1

(12) EX PARTE REEXAMINATION CERTIFICATE (6106th)
United States Patent
Bailey

(10) Number: US 6,758,442 C1
(45) Certificate Issued: Jan. 22, 2008

(54) GUIDED PARAFOIL SYSTEM FOR DELIVERING LIGHTWEIGHT PAYLOADS

(75) Inventor: Glen Randall Bailey, Scottsdale, AZ (US)

(73) Assignee: Stara Technologies, Inc., Mesa, AZ (US)

Reexamination Request:
No. 90/007,631, Jul. 15, 2005

Reexamination Certificate for:
Patent No.: 6,758,442
Issued: Jul. 6, 2004
Appl. No.: 10/284,699
Filed: Oct. 30, 2002

(51) Int. Cl.
*B64D 17/00* (2006.01)

(52) U.S. Cl. .................................................. 244/142
(58) Field of Classification Search .................. None
See application file for complete search history.

(56) References Cited

U.S. PATENT DOCUMENTS

| 3,433,441 A | 3/1969 | Cummings | 17/34 |
| 4,113,208 A | 9/1978 | Manfredi | |
| 6,758,442 B2 | 7/2004 | Bailey | |

OTHER PUBLICATIONS

GNC Concept For Automated Landing Of A Large Parafoil, Uwe Soppa, Hans Strauch, Laurent Goerig, Jean Pierre Belmont & Oliver Cantinaud, Jun. 3–5, 1997, p. 1, 14th AIAA Aerodynamic Decelerator Systems Technology Conference.

Demonstration of Precision–Guided Ram–Air Parafoil Airdrop Using GPS/INS Navigation, Philip D. Hattis & Richard Benney, Jun. 19–21, 1996, 52nd Annual Meeting of the Institute of Navigation.

Alex G. Sim, James E. Murray, David C. Neufeld and R. Dale Reed, The Development and Flight Test of a Deployable Precision Landing System for Spacecraft Recovery, Sep. 1993, NASA Technical, Memorandum 4525.

Dryden Flight Research Center, Spacewedge, NASA Fact sheet, FS–2002–09–045 DFRC.

Thomas Jann, Aerodynamic Model Identification and GNC Design for the Parafoil–Load System Alex, Copyright 2001, American Institute of Aeronautics and Astronautics, San Francisco, CA, A01–29270, AIAA–2001–2015.

William K. Wailes and Nancy E. Harrington, The Guided Parafoil Airborne Delivery System Program, Copyright 1995, American Institute of Aeronautics and Astronautics, San Francisco, CA, AIAA–95–1538–CP.

Roger F. Allen, Orion Advanced Precision Airborne Delivery System, May 15–19, 1995, 13th AIAA Aerodynamic Decelerator Systems Conference, Clearwater Beach, FL, AIAA–95–1539.

Jeffrey R. Hogue and Henry R. Jex, Applying Parachute Canopy Control and Guidance Methodology to Advanced Precision Airborne Delivery Systems, May 15–18, 1995, 13th AIAA Aerodynamic Decelerator Systems Conference, Clearwater Beach, FL, AIAA–95–1537.

(Continued)

*Primary Examiner*—Andres Kashnikow

(57) ABSTRACT

A guided parafoil system for delivering lightweight payloads provides an accurate, small and low-cost delivery system for small payloads such as chemical sensor packages. The delivery system is adapted to fit along with the payload within a standardized canister. The delivery system includes a parafoil and a guidance control system that includes a global positioning system (GPS) receiver and an electronic compass to detect a deviation and bearing from a desired target. The parafoil is guided by a single motor that turns the parafoil in a horizontal direction perpendicular to the current direction of travel in response to deviations detected from a desired course. The desired course is initially linear until the system reaches a predetermined horizontal radius from the target and then the course becomes a circular path around and above the target.

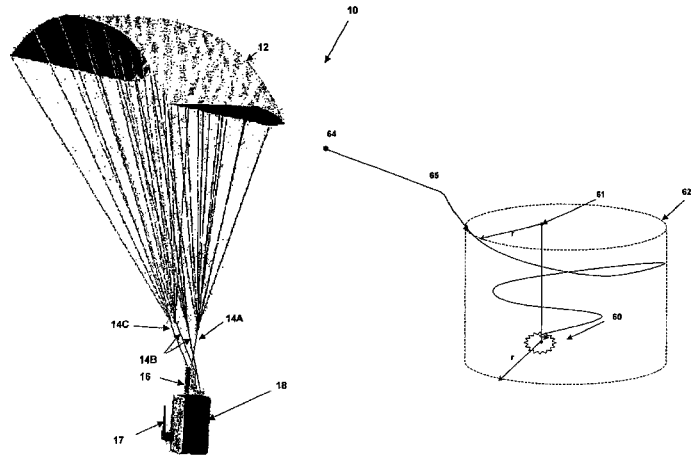

OTHER PUBLICATIONS

Takashi Nakajima, Takamasa Yamagami and Shigeo Ohta, Guidance Experiment of Gliding Parachute Dropped From Balloon, Copyright 1995, American Institute of Aeronautics and Astronautics, San Francisco, CA, AIAA–95–1541–CP.

Dr. Phillip D. Hattis, Dr. Brent D. Appleby, Thomas J. Fill and Richard Benney, Precision Guided Airdrop System Flight Test Results, Copyright 1997, American Institute of Aeronautics and Astronautics, San Francisco, CA, AIAA–97–1468.

Andrew W. Bennett, Design of a Precision Airdrop System, Copyright 1997, American Institute of Aeronautics and Astronautics, San Francisco, CA, AIAA–97–1469.

Jeff Fisher, Semi–Rigid Deployable Wing (SDW) Advanced Precision Airborne Delivery System, Copyright 1997, American Institute of Aeronautics and Astronautics, San Francisco, CA, AIAA–97–1495; A97–31299.

Jean Evrard and Andre Vargas, New Recovery Systems for Straspheric Balloon Gondolas, Jun. 28–Jul. 1, 1999, AIAA International Balloon Technology Conference, Norfolk, VA, AIAA–99–3889; A99–33347.

S. Dellicker, R Benney, S. Patel, T. Williams, C. Hewgley, O. Yakimenko, R. Howard and I. Kaminer, Performance, Control and Simulation of the Affordable Guided Airdrop System, Aug. 14–17, 2000, AIAA Modeling and Simulation Technologies Conference and Exhibit, Denver, CO, AIAA–200–4309; A00–37301.

Edward "Ted" Strong, Personnel Guided Aerial Delivery of All Terrain Vehicles, May 21–24, 2001, 16th AIAA Aerodynamic Decelerator Systems Technology, Boston, MA, AIAA–2001–2055; A01–29307.

James E. Murray, Alex G. Sim, David C. Neufeld, Patrick K. Rennich, Stephen R. Norris and Wesley S. Hughes, Further Development and Flight Test of an Autonomus Precision Landing System Using a Parafoil, Jul. 1994, NASA Technical, Memorandum 4599.

W. Gockel, Concept Studies of an Autonomous GNC System for Gliding Parachute, Copyright 1997, American Institute of Aeronautics and Astronautics, San Francisco, CA, A97–31289.

Isaac I. Kaminer and Oleg A. Yakimenko, Development of Control Algorithm for the Autonomous Gliding Delivery System, American Institute of Aeronautics and Astronautics, San Francisco, CA, AIAA–2003–2116.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–20 are cancelled.

\* \* \* \* \*